United States Patent

[11] 3,596,446

| [72] | Inventor | Gideon M. Bryan |
| | | Winston-Salem, N.C. |
| [21] | Appl. No. | 804,953 |
| [22] | Filed | Mar. 6, 1969 |
| [45] | Patented | Aug. 3, 1971 |
| [73] | Assignee | Sidney C. Whiteheart |
| | | Winston-Salem, N.C. |
| | | a part interest |

[54] ADAPTER FOR YIELDABLY CONNECTING THE BLADE OF A ROTARY LAWN MOWER TO THE DRIVE SHAFT
8 Claims, 4 Drawing Figs.

[52] U.S. Cl. ................................................. 56/10.3, 64/29
[51] Int. Cl. ............................................. A01d 35/26
[50] Field of Search........................................... 64/28, 29; 192/46, 56; 56/295, 25.4

[56] References Cited
UNITED STATES PATENTS

| 1,565,754 | 12/1925 | Orth | 64/29 |
| 1,870,646 | 8/1932 | Pitter | 64/29 X |
| 2,257,759 | 10/1941 | Niemann | 64/29 X |
| 2,803,103 | 8/1957 | Kollman | 64/29 UX |
| 2,983,122 | 5/1961 | Polzin | 64/29 |
| 3,050,923 | 8/1962 | Sanderson | 64/29 X |
| 3,430,461 | 3/1969 | Boylan | 64/28 |

*Primary Examiner*—Milton Kaufman
*Attorney*—Hunt, Heard & Rhodes

ABSTRACT: This invention is directed to an adapter for yieldably connecting the drive shaft of a rotary lawn mower with the mower blade, and more particularly to an adapter comprising a pair of clutch plates, each having a plurality of teeth thereon, the faces being normally urged into engagement with each other, so that the teeth mesh. One of the clutch plates is slidably mounted on the drive shaft, and the other plate, to which the blade is attached, is rotatable with respect to the drive shaft when the two clutch plates are disengaged. The opposing faces of the two clutch plates are resiliently urged together during operation of the mower forming a drive means for the blades. However, when a large rock, stake, or other unyieldable object is encountered by the blade, the resilient clutch connection allows the two clutch plates to separate sightly permitting the drive shaft to continue rotating, although the blade itself remains stationary.

PATENTED AUG 3 1971
3,596,446
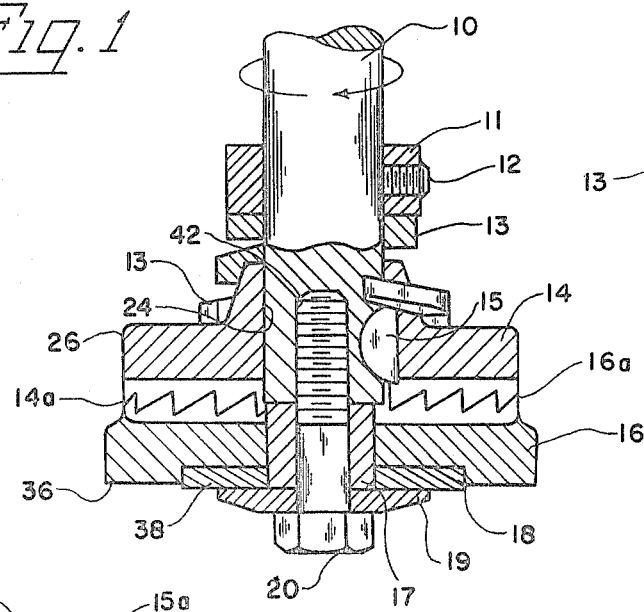
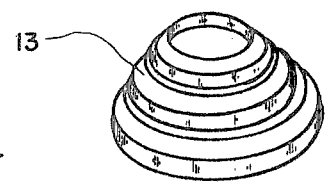
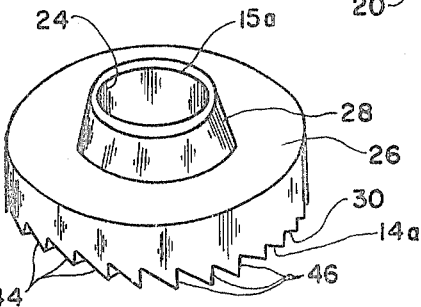
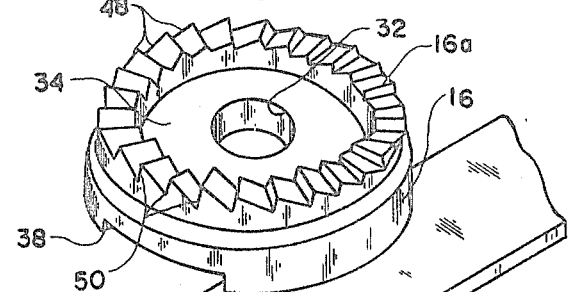
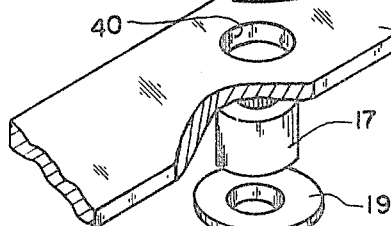
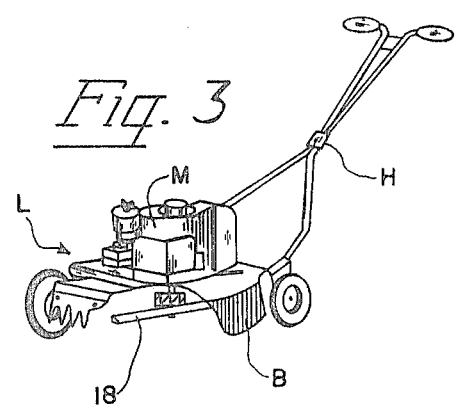
INVENTOR.
GIDEON M. BRYAN
BY Hunt + Rhodes

ADAPTER FOR YIELDABLY CONNECTING THE BLADE OF A ROTARY LAWN MOWER TO THE DRIVE SHAFT

BACKGROUND OF THE INVENTION

In recent years, lawnmowers of the "rotary" type have been developed to the stage that now they are the most predominant type in use today. The engines of these mowers turn at relatively high speeds (2,400—3,600 r.p.m.), and the 18 inch to 24 inch blades develop a relatively high torque which is disadvantageous in that the impact of the blade against a foreign object such as a rock, stake, or the like, will bend or distort the drive shaft.

Attempts have been made to solve this problem by providing a yieldable coupling between the drive shaft and the mower blade. For example, the Moody U.S. Pat. No. 2,978,858 discloses a yieldable drive connection for a rotary lawnmower comprising a blade having a series of apertures peripherally spaced around the point on the blade to which the drive shaft is attached. A coupling is attached to the drive shaft and includes a series of balls held by bores in the coupling and resiliently urged into the apertures in the blade. This "ball in detent" connection, according to the patent, is sufficiently strong to drive the blade, yet resilient enough to disengage the shaft from the blade when a foreign object is struck. Such an arrangement has not proven to be satisfactory, however, because first of all the apertures in the blades tend to weaken the blade, so that upon impact with a foreign object the blades frequently break. Moreover, the balls are merely crimped into the detents or passageways to keep them in place, and they tend to work loose and are lost. Finally, the device shown by the Moody patent does not prevent backlash, since the balls 30 allow the blade to slip in either direction. It is necessary that the blade turn only in the direction in which the motor is turning and movement in the opposite direction as a result of backlash causes the distortion in the shaft.

The present invention on the other hand is designed to immediately free the drive shaft by a simple overload clutch mechanism which, upon impact of the mower blade with a stake or the like, allows the drive shaft to continue its rotation while the blade remains stationary, so that the force of impact will not be transferred to the shaft. The clutch mechanism permits slight separation or disengagement of the teeth in the two clutch plates, thereby overcoming the compressive force of a spring which normally urges the two clutch members together. Therefore, the force of impact is taken up in the spring, rather than in the drive shaft, so that distortion of the shaft is prevented.

It is therefore an object of this invention to provide an improved drive connection between a rotary lawnmower shaft and the blade, whereby shaft distortion is prevented upon impact of the blade against a foreign object.

It is a further and more specific object of the invention to provide an adapter for yieldably connecting the drive shaft of a rotary lawnmower with the blade thereof, whereby the drive shaft is permitted to rotate slightly after the blade has struck a foreign object such as a stone or stake.

It is still a further object of the invention to provide an adapter for yieldably connecting the drive shaft of a rotary lawnmower and the blade thereof comprising a pair of adjacent clutch plates, yieldably urged into engagement with the other, the opposing surface of each plate including a plurality of teeth adapted to mesh with like members on the other plate.

These and other objects of the invention will become apparent from the following description and accompanying drawings wherein:

FIG. 1 is an elevational view, partly in section, of the yieldable adapter according to the present invention in the assembled, normal operating position;

FIG. 2 is an exploded perspective view, with a portion of the lawnmower blade broken away and the drive shaft omitted, of the components of the adapter assembly shown in FIG. 1;

FIG. 3 is an environmental view of a rotary lawnmower, with a portion of the lawnmower broken away to show the position of the adapter relative to the remainder of the lawnmower;

FIG. 4 is a perspective view of the coil spring which urges the two clutch plates of the adapter together.

Referring now to the drawings and more specifically to FIG. 3, there is shown a conventional rotary lawnmower L comprising a handle portion H, a blade housing B including a motor M mounted atop thereof, and a blade 18 attached to the drive shaft which extends downwardly from motor M beneath the blade housing B.

Turning now to FIGS. 1 and 2, the numeral 10 indicates the vertical drive shaft which extends downwardly from motor M into the area beneath the blade housing B. A first, upper clutch plate 14 includes a central opening 24 which receives the drive shaft at a point generally near the lower extremity of the shaft. Plate 14 is slidable in an axial direction along shaft 10, however is prevented from rotational movement relative to the shaft in the following manner. A woodruff key 15 extends outwardly from drive shaft 10 and is received in key slot 15a which extends axially throughout the length of the wall of the central opening 24 in upper clutch plate 14. Such an arrangement prevents relative rotational movement between drive shaft 10 and upper clutch plate 14, so that the clutch plate rotates at the shaft speed.

Clutch plate 14 is a generally disc-shaped member comprising an upper face 26 having a shoulder 28 surrounding central opening 24 and extending upwardly therefrom. The lower surface 30 of upper clutch plate 14 includes a series of teeth 14a arranged in a circular path surrounding opening 24 near the periphery of the plate.

A second, lower clutch plate 16 is also a generally disc-shaped member having a central opening 32 therethrough and further comprising an upper surface 34 and a lower surface 36. A series of teeth 16a similar to those on the lower surface of clutch plate 14 are also arranged on upper surface 34 in a circular path of the same diameter as the path in which teeth 14a are arranged. During normal use of the lawnmower teeth 16a are resiliently urged into meshing arrangement or engagement with teeth 14a. A recess 38 extends diametrically across the lower surface 36 of plate 16 for receiving lawnmower blade 18 therein.

As best shown in FIG. 2, teeth or ratchet members 14a and 16a comprise a series of upstanding, substantially perpendicular walls 46 and 50 respectively, arranged transversely of the circular path. Inclined surfaces 44 and 48 connect the upper end of one upstanding wall with the lower end of the next succeeding wall 46 or 50 respectively. Moreover, the inclined surfaces 44 and 48 extend angularly upward in the direction of rotation of shaft 10. Such an arrangement allows the yieldable assembly to rotate in one direction only after a foreign object has been engaged, preventing backlash which causes shaft 10 to become distorted.

A bearing 17 is received through opening 32 in lower clutch plate 16 and opening 40 in blade 18, and in the assembled position is brought to bear firmly against the lower extremity of drive shaft 10. Bolt 20 extends through bearing 17 into a bore 42 in the lower extremity of drive shaft 10 and along with washer 19 retains the blade 18 within recess 38 of lower clutch plate 16 and in turn urges bearing 17 against the end of shaft 10. So arranged, bearing 17 is nonrotatable with respect to shaft 10, however lower clutch plate 16 is free to rotate about bearing 17.

A collar 11 is fixed to shaft 10 by setscrew 12 at a position slightly spaced from the upper surface 26 of upper clutch plate 14, and a compression type coil spring 13, surrounding drive shaft 10 extends between collar 11 and upper surface 26. The distance between collar 11 and upper surface 26 is less than the relaxed axial length of coil spring 13, so that the spring provides continuous downward pressure on upper clutch plate 14, keeping it in meshed arrangement with lower clutch plate 16. Also, plate 14 is preferably provided with upstanding shoulder 28 to aid in keeping spring 13 in proper position.

In such an assembly, since upper clutch plate 14 is nonrotatable relative to shaft 10, the rotation of shaft 10 also causes upper clutch plate 14 to rotate. As long as teeth 14a and 16a are in meshed relationship, lower clutch plate 16 will revolve at the same speed as shaft 10 thus operating blade 18. On the other hand, when blade 18 strikes a foreign stationary object, both the blade and lower clutch plate 16 are stopped. Since bearing 17 is secured to drive shaft 10 and rotatable within opening 32 of clutch plate 16, the drive shaft is free to continue its rotary movement somewhat causing the inclined portions 44 of teeth 14a to ride up the inclined portion 48 of teeth 16a. It is clear that when teeth 14a and 16a separate, upper clutch plate 14 is urged upwardly compressing spring 13. The resulting reaction of spring 13 impedes this movement, eventually slowing down the speed of drive shaft 10 and causing the motor M to stall.

It is thus apparent that the arrangement described above provides a strong drive connection between drive shaft 10 and blade 18 during normal operation of the mower, however is sufficiently yieldable upon impact of the blade with a foreign object to prevent resulting damage to or bending of shaft 10. On the other hand, the blade is not weakened by additional apertures.

There is thus provided a yieldable connection between a rotary lawnmower drive shaft and a lawnmower blade which comprises a simple overload clutch mechanism which prevents shaft damage or distortion upon impact of the blade against a foreign object.

It is to be understood that various modifications of the invention may be apparent to those skilled in the art without departing from the spirit or scope there, and it is intended that the invention be defined only by the scope of the following claims.

I claim:

1. An adapter for yieldably connecting the blade of a rotary lawnmower to a vertical drive shaft having the upper end thereof connected to a rotative force means, said adapted comprising:
   a. a first and second clutch plate, said first plate including a central opening for slidably receiving the drive shaft of said lawnmower, means for preventing rotational movement of said first plate relative to said shaft, said second plate including a central opening for attachment to the terminal end of said drive shaft, said second plate being rotatable with respect to said drive shaft and including a means thereon for securing the mower blade thereto;
   b. a plurality of teeth annularly arranged on opposing surfaces of said plates, each of said teeth comprising an inclined wall and a vertical wall with the inclined wall angling upward in the direction of rotation; and
   c. resilient means for urging said opposing surfaces together in the operative position causing the teeth to mesh together, whereby the driving force is transmitted from the drive shaft to the inclined walls of said teeth.

2. The adapter according to claim 1 wherein an axially extending keyway is provided in the wall of said first clutch plate surrounding said opening in said first clutch plate for receiving a key protruding from said drive shaft, whereby said first clutch plate is slidable along said drive shaft in a direction parallel to the axis of said shaft, however is prevented from rotating relative to said drive shaft.

3. The adapter according to claim 1 wherein said securing means on said second plate includes a diametrically extending recess on the underside thereof for receiving the blade of said lawnmower.

4. The adapter according to claim 1 wherein said means for urging said clutch plates together include a means for holding said second clutch plate stationary with respect to axial movement along said drive shaft and a compression-type coil spring bearing against the upper surface of said first clutch plate.

5. In a rotary lawnmower, the combination of a drive shaft, a mower blade and a yieldable drive connection between said drive shaft and said blade comprising:
   a. a generally vertical drive shaft connected at the upper end to a rotational force means;
   b. a first clutch plate, including a central opening, said clutch plate slidably attached to said drive shaft and nonrotatable with respect to said drive shaft;
   c. a second clutch plate including a central opening, said second plate being attached to said drive shaft at a position below said first clutch plate and being rotatable with respect to said drive shaft;
   d. a plurality of teeth annularly arranged on opposing surfaces of said plates, each of said teeth comprising an inclined wall and a vertical wall with the inclined wall angling upwardly in the direction of rotation;
   e. the teeth of said first and second clutch plate being resiliently urged into bearing relation with each other during normal operation; and
   f. said second clutch plate having means thereon for securing said blade thereto.

6. The combination according to claim 5 wherein a collar is secured to said drive shaft at a point slightly spaced from the upper surface of said first clutch plate, a compression spring surrounding said drive shaft extends between said collar and the upper surface of said first clutch plate, and the distance between said collar and the upper surface of said clutch plate is less than the longitudinal axial dimension of said spring in its relaxed condition.

7. The combination according to claim 5 wherein an axially extending keyway is provided along the length of the wall forming said central opening in said first clutch plate, a key protrudes radially from said drive shaft and is received within said keyway, whereby said first clutch plate is free to slide along said drive shaft in a direction parallel to the axis of said shaft, however is prevented from rotating with respect to said drive shaft.

8. The combination according to claim 6 wherein said means for securing the blade to said second clutch plate comprises a central opening in said blade, a diametrically extending recess in the lower surface of said second clutch plate, said blade being received in said recess, a bearing extending through an opening in said blade and said opening in said second clutch plate, one end of said bearing engaging the terminal end of said shaft, and a bolt inserted through the other end of said bearing and being secured in a threaded bore in the end of said shaft, whereby said bearing is held securely against the shaft.